United States Patent Office 3,475,771
Patented Nov. 4, 1969

3,475,771
TREATMENT OF SYNTHETIC POLYAMIDE MATERIALS WITH A MIXTURE OF HALOGENATED ALKANES AND HALOGENATED MONOCARBOXYLIC ACIDS
Richard G. Quynn, Summit, N.J., assignor to Celanese Corporation, New York, N.Y., a corporation of Delaware
No Drawing. Filed June 28, 1965, Ser. No. 467,729
Int. Cl. D06m *3/30;* D06p *3/24*
U.S. Cl. 8—173
14 Claims

ABSTRACT OF THE DISCLOSURE

A method of improving the dye-receptivity properties of wet-formed, difficulty-meltable polyamide shaped polymers, such as fibers, particularly poly(polymethylene) terephthalamides, and isophthalamides and polyhexamethylene terephthalamides and isophthalamides, by treating the shaped-polymer with a mixture of a halogenated alkane and a hologenated monocarboxylic acid to swell the polymer but not dissolve it and subsequently removing mixture thereby improving the properties of the treated fiber.

---

This invention relates broadly to the art of treating shaped polymers. More particularly it is concerned with the art of improving the physical properties, especially dyeability characteristics, of a shaped, wet-formed (e.g., filamentary, wet-spun), difficulty-meltable polymer containing repeating amide groups as a part of the polymer chain. Examples of such polymers are poly(polymethylene) terephthalamides and isophthalamides; and, more specifically, polyhexamethylene terephthalamide and isophthalamide.

By "difficulty-meltable" polymers as used herein are meant polymers that cannot be shaped easily using melt-extrusion techniques because they tend to degrade materially and/or to polymerize further to a useless, infusible mass when heated sufficiently to melt them. By shaped, "wet-formed," specifically "wet-spun," polymers are means shaped polymers that have been formed, more particularly spun, by extruding a solvent solution of the polymer through an orifice or orifices into a liquid coagulant in which the solvent is soluble but the polymer is insoluble, as distinguished from shaped articles that are formed, for example, by melt- or dry-extrusion (e.g. melt- or dry-spinning) techniques.

It was known prior to the present invention that polymers to which this invention is applicable could be formed into shaped articles by extruding a solvent solution thereof through an opening or openings of predetermined cross-section to form such articles. See, for example, U.S. Patents 3,154,512 and 3,154,612 of Parczewski; 3,154,609, Cipriani; 3,154,610, Denyes; and 3,154,614, Epstein et al., each dated Oct. 27, 1964. The polymers broadly described in the first paragraph of this specification can be made into useful articles, e.g. filaments, (both mono- and multifilaments) and fibers (including cut tow or staple fibers), for the manufacture of textiles and films and other shaped structures by processes such as disclosed in the foregoing patents. By this cross-reference these patents, which are assigned to the same assignee as the present invention, are made a part of the disclosure of the present application.

The presence of microscopic and submicroscopic voids, to a greater or lesser degree, is shaped wet-formed difficultly-meltable polymers of the kind broadly described hereinbefore and more specifically hereafter is almost always a characteristic of the washed and dried, wet-formed polymers in untreated state, that is, in the absence of a suitable relaxation treatment that effects an actual shrinkage of the polymer in filamentary or other shaped form, or, if the filament be held at constant length, a relaxation treatment which causes an increase of tension within the filament. This is particularly true when the extrudable composition is a solution of the polymer dissolved in concentrated sulfuric acid (e.g., 75 to 100%, preferably 95 to 100%, by weight $H_2SO_4$ concentration), and the liquid coagulant or "spin" bath into which the aforesaid composition is extruded is aqueous sulfuric acid having an acid concentration lower than that in which the polymer is dissolved such that the polymer is coagulated into a shaped article. For example, the concentration of the $H_2SO_4$ in the liquid coagulating bath may be below 65%, more particularly below 60%, e.g., from 5 or 10% to 55 or 60%, but preferably within the range of from about 40% to 52 or 53% $H_2SO_4$.

The presence of the aforementioned voids in the washed and dried, shaped polymer is undesirable for several reasons. For example, such voids result or tend to result in a shaped article such as a spun filament or fiber that is either semi-dull or has an uncontrolled level of dullness. These characteristics are undesirable and restrict the marketability of the filamentary material and fabrics made therefrom. Further, dyed filaments or fabrics containing the aforementioned voids exhibit a lower visual depth of shades than other filaments not containing voids, when both are dyed with the same dyestuff and to the same amount (weight) of dyestuff.

The void structure thus affects the dyeability or dye-receptivity of the shaped structure and the visual appearance of the dyed, shaped structure in some manner that is not clearly understood. It has interfered with efforts to determine substantivity, rates of dyeing and shade levels.

There is also some indication that the presence of voids lowers or tends to lower the tensile properties of the polymer in filamentary form. For example, it has been noted that an increasing level of void formation in filaments produced in the same spin bath (i.e., at different spin bath temperatures and/or different spin bath concentrations (in the $H_2SO_4/H_2O$ system)) coincides with decreasing tensile properties. It is also possible that the presence of voids has been responsible for often attaining only mediocre tensile-property improvement upon hot drawing filaments of the polymer.

The present invention is one solution to the problem of improving the properties, e.g., by removing voids from, and improving the dye-receptivity of, shaped wet-formed difficultly-meltable polymers containing repeating amide groups as a part of the polymer chain. It is based on my discovery of a particular treating agent for such shaped polymers and which comprises a mixture of halogenated compounds within two limited classes in a critical range of volume proportions of each. This treating agent is sometimes designated herein and in the appended claims as a "dyeability-improving" (i.e., dye receptivity-improving) treating agent inasmuch as this is one of its most desirable effects. However, it is to be understood that the use of the term "dyeability-improving" is not intended to imply that only the dyeability or dye-receptivity characteristics of the shaped polymer are improved by contacting the aforesaid polymer with the treating agent employed in practicing this invention, since the agent generally functions also in other ways, e.g., to remove voids that are of microscopic or submicroscopic size, to improve the luster, and otherwise to alter the physical structure of the polymer thereby to improve other properties or characteristics.

The treating agent

The dyeability-improving treating agent employed in carrying the instant invention into effect is comprised of, or consists essentially of (a) at least one member of the group of halogenated alkanes having from one through four carbon atoms, and at least one hydrogen atom when the alkane contains from two through four carbon atoms, and (b) at least one member of the group of halogenated monocarboxylic acids represented by the general formula (I)     $X_m C_n H_{(2n+1-m)} COOH$ wherein $n$ is an integer from one to four, X represents halogen atoms selected from the group consisting of chlorine, bromine and fluorine, and $m$ is an integer from one to $(2n+1)$. When $m$ is greater than one, the halogen atoms represented by X may be the same or different. The volume proportions of (a) and (b) at about 25° C. are such as to effect swelling of the shaped polymer at the application temperature but insufficient to dissolve it at the said temperature. Thus, the aforesaid volume proportions of (a) and (b) may be, for example, within the range of from 65% (about 65%) to 97% (about 97%) of (a) to from 3% (about 3%) to 35% (about 35%) of (b); and, more particularly, from 80-95% of (a) to 5-20% of (b). Good results have been obtained using a treating agent comprising or consisting of about 90 volume percent of (a) and about 10 volume percent of (b).

The components of the above-described treating agent are such that it is not unduly difficult to maintain control over their concentration during use thereof in order to obtain the exact desired degree of relaxation. Furthermore, there is no evidence that they are preferentially adsorbed and/or absorbed by the filamentary or other shaped polymer undergoing treatment. In most cases the treating agent (especially the preferred type or kind) seems to be effective when applied at relatively low temperatures such as ambient temperature (particularly when relatively longer treating periods are used), thereby avoiding any possibility of materially degrading and discoloring the polymer such as may happen when other treating agents that require the use of high temperatures and/or high pressures in order to provide the necessary shrinkage or relaxation with or without shrinkage, are employed. Additionally, unlike many chemical treating agents that are applied to shaped polymers in filamentary or other form in order to improve their dyeability, no particular problems are encountered in removing the treating agent from the treated filament or other shaped structure.

Illustrative examples of halogenated alkanes constituting component (a) of the treating agent are:

Dichloromethane (methylene dichloride)
Carbon tetrachloride
Chloroform
1,2-dichloroethane
2,2-dichloropropane ($CH_3CCl_2CH_3$)
1,2-dichloropropane
1,3-dichloropropane
1,4-dichlorobutane
1,2,3-trichloropropane
1,1,2,2-tetrachloroethane ($CHCl_2CHCl_2$)
1,1,2,2,2-pentachloroethane ($CHCl_2CCl_3$)
Dibromomethane
Bromoform
1,1-dibromoethane
1,1-dibromopropane
1,2-dibromopropane
1,4-dibromobutane
1,1,1,2-tetrabromoethane
1,1,2,2-pentabromoethane
1-bromo-2-chloroethane ($CH_2ClCH_2Br$)
1-bromo-2-chloropropane ($CH_3CHClCH_2Br$)
2-bromo-1-chloropropane ($CH_3CHBrCH_2Cl$)

Other examples will be apparent to those skilled in the art from the foregoing illustrative examples and from the definition of component (a) of the treating agent as previously has been defined.

Instead of using a single halogenated alkane of the kind just described as component (a), one may use a plurality (e.g., two, three or any desired higher number) of such halogenated alkanes. Preferably component (a) is dichloromethane or s-tetrachloroethane.

Illustrative examples of halogenated monocarboxylic acids constituting component (b) of the treating agent, and which are embraced by Formula I, are the various available chlorinated, brominated, chlorinated-fluorinated, and fluorinated acetic acids, and the corresponding halogenated propionic, butyric and valeric acids (both normal and isomeric forms), e.g., the mono-, di- and trichloroacetic acids, monobromoacetic acid, di- and tri-fluoroacetic acids, the 2-chloro- and 3-chloropropionic acids, etc. The chosen halogenated monocarboxylic acid is, for obvious reasons, advantageously one that is stable at the application temperature. Preferably the (b) component of the treating agent is dichloro- or trichloroacetic acid.

The shaped polymer

The polymer that is wet-formed into a filamentary or other shaped structure or body and then treated in accordance with this invention is a difficultly-meltable polymer containing repeating amide groups as a part of the polymer chain. Illustrative of such polymers are those having repeating structural units of the formula (II)     —NR—Y—NR′—CO—Y′—CO— that result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower alkyl such as methyl or ethyl, and the Y's, which also may be the same or different, are divalent organic radicals such as alkylene, e.g., ethylene, tetramethylene or hexamethylene, arylene such as para- and meta-phenylene, para- and meta-xylylene, and para- and meta-diethylene benzene, cycloalkylene such as 1,4-cyclohexylene and divalent heterocyclic radicals such as those derived from piperazine, and monoalkyl and dialkyl piperazines, e.g., 2-methyl- and 2,5-dimethyl piperazines and 2-ethyl- and 2,5-diethyl piperazines, wherein the open bonds are attached to the nitrogen atoms, and wherein the chemical structure of the polymer and/or the polymerization technique used is such that a relatively high-melting (difficulty-meltable) polymer is obtained.

An important group of polyamides within the above group, and to which the treatment of wet-formed shaped products thereof the present invention is especially applicable, includes those in which Y and/or Y′ is or contains a para- or meta-phenylene radical or a 1,4-cyclohexylene radical. Particularly important are condensation products of a diamine and terephthalic acid or a derivative of terephthalic acid, e.g., terephthalyl chloride or a dialkyl terephthalate. Some specific polymers within this latter group are poly(polymethylene) terephthalamides wherein the polymethylene groups contain, for example, from 2 to 10 carbon atoms, inclusive, e.g., polyhexamethylene terephthalamide, polyoctamethylene terephthalamide, polytetramethylene terephthalamide, polyethylene terephthalamide, and polypiperazylene terephthalamide. Other polyterephthalamides are poly(o-, m-, and p-phenylene) terephthalamides, poly(o-, m-, and p-xylylene) terephthalamides and poly(o-, m-, and p-diethylenephenylene) terephthalamides, the latter produced, for example, by condensing an ester-forming derivative of terephthalic acid with para-bis (beta-aminoethyl)benzene.

The method of this invention is applicable to the treatment of filaments, fibers, films and other shaped articles comprised of wet-formed difficultly-meltable polyamides of aromatic acids other than terephthalic acid, e.g., of isophthalic acid, 2,6-naphthalenedicarboxylic acid, p,p′-dicarboxydiphenyl, (p,p′ - dicarboxydiphenyl)methane, phenylenediacetic acid, phenylenedipropionic acid, and phenylenedibutyric acid. The diamine moieties of these other aromatic carboxylic acids may be the same as in the aforementioned polyterephthalamides. Illustrative, then, of polyamides other than the polyterephthalamides are the polyisophthalamides, specifically polyethylene isophthalamide. Still other examples are high-melting or difficultly-meltable polyamides resulting from a condensation reaction between (a) alkylene dicarboxylic acids such as adipic and (b) cyclic diamines such as p-xylylene diamine and p-bis-amino-ethylbenzene.

From the foregoing description it will be seen that particularly useful fiber- and film-forming linear polyterephthalamides and polyisophthalamides are those having repeating structural units of the formulas (III)  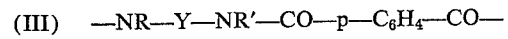

and (IV)  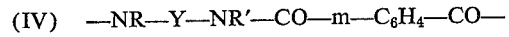

respectively, and which results from the condensation of terephthalic acid or isophthalic acid, or a derivative thereof, e.g., an ester, acyl halide or salt of such an acid, with a diamine. In the above formulas R, R' and Y have the same meanings as given above with reference to Formula II.

The aforementioned polyamides can be formed into shaped articles by extruding a solvent solution of the polymer into a liquid coagulant using solvents, liquid coagulants and shaping, specifically filament-forming, techniques such as are described in the patents mentioned in the third paragraph of this specification. In producing wet-spun filaments, the freshly-formed, gelled filaments may be oriented along their longitudinal axis by stretching, after which they are washed, dried and then treated with the treating agent employed in this invention; or, the treating agent may be applied to the filamentary material if initially washed with a non-aqueous washing agent, followed by further washing with water to remove the treating agent, and final drying. The treatment may be applied to untensioned filaments or to filaments while maintained as substantially constant length during the treatment.

The treatment involved in this invention may be applied to the above-described shaped, wet-formed, e.g., wet-spun, polyamides in filamentary form and to felted, woven, knitted or other fabrics made from such polyamide filaments.

Application of treating agent

Any suitable means may be employed in contacting the shaped or fabricated polymer with the treating agent. Usually the treating agent is in liquid state when applied, especially when it is a liquid at ambient temperature, or is convertible to a liquid (either by melting or by dissolving in an inert solvent) at the chosen application temperature. The "liquid" treating agent (and by "liquid" it is meant that the treating agent is in liquid state at the application temperature) may be applied, for example, by imersing the shaped polymer in the liquid; by spraying or dripping the treating agent upon the continuously moving filaments, especially when they are continuously advancing in a helical path over skewed rolls or other arrangement of rolls; or by brushing, padding or other conventional techniques for applying liquids to solid structures or substrates.

Instead of being in the liquid phase at the application temperature, the treating agent may be in gaseous-liquid state. For example, the shaped polymer may be placed above a refluxing liquid treating agent so that the said agent comprises a mixture of gaseous and liquid phases as it contacts the filamentary material or other shaped article undergoing treatment. It will be understood, of course, by those skilled in the art that the application of the treating agent in gaseous phase alone is not precluded. Ordinarily, no particular advantages are attained by this procedure, and it has obvious disadvantages.

The treating agent may be applied to the shaped polymer at atmospheric, subatmospheric or superatmospheric pressures. A combination of any two or all three of such pressure conditions, and in any order, may sometimes be desirable. The use of pressures above or below atmospheric, individually or collectively or in combination with an atmospheric-pressure treatment, depends upon such influencing factors as, for example, the composition and physical state of the treating agent, the application temperature, the shaped polymer and its physical characteristics such as the relative ease or difficulty with which it is penetrated by the chosen treating agent, and other factors.

The shaped polymer in filamentary, film, fabric or other form may be treated batchwise or in semi-continuous or continuous operations. A continuous method of treatment is preferred, especially when the shaped polymer is of continuous (i.e., indefinite) length as in, for example, continuous filamentary materials such as threads, tows, etc., films and fabrics of continuous length, and others.

In general, the application or treating temperatures of the treating agent, especially when the treatment is effected under atmospheric pressure conditions, are within the range of from ambient temperature (usually 20°–30° C.) up to the initial boiling point of the treating agent at atmospheric pressure. The treating temperature may be below ambient temperature when the treating agent contains a component that boils at ambient temperature and ambient pressure conditions and when it is desired to maintain the treating agent in liquid state. In such a case, the application temperature of the treating agent may be reduced so as to maintain it in liquid state; or, alternatively, superatmospheric pressure sufficient to maintain the treating agent in liquid state may be employed, in which case a higher application temperature then may be used, if desired.

For obvious reasons, it is desirable that the time and temperature of the treating agent during its contact with the shaped polymer are not such as will cause softening of the shaped polymer, and especially when the latter is in the form of multifilamentary material or fabric. In such cases, the use of treating temperatures so high as to cause softening of the polymer often results in sticking or fusing together of the individual filaments.

The period of time that the treating agent remains in contact with the shaped polymer is in all cases sufficient to improve the useful properties, especially dye-receptivity, of the treated polymer. It is difficult to state this time period with exact precision since there are so many different influencing variables that may alter it. The available evidence indicates that the contact time at the application temperature and pressure should, for optimum results, be sufficient to result in complete penetration of the shaped polymer by the treating agent. Microscopic observations showed that complete penetration of 3 denier/filament (d.p.f.) fiber of polyhexamethylene terephthalamides required from 45–60 seconds of contact at about 25° C. with a treating agent consisting of, by volume, 90% dichloromethane ($MeCl_2$) and 10% dichloroacetic acid (DCAA), and that progressive "clearing" or removal of the microscopically visible voids coincided with penetration of the treating agent. Penetration was accompanied in this case by radial swelling, plus some curling or self-crimping of the fiber in cases where the fiber was not held at fixed length. The voids did not reappear on washing the fiber free of the treating agent, or upon boiling off the treated fiber.

Under other conditions using other treating agents in treating other shaped polymers, e.g., very fine filaments, the treating time may be less than 45 seconds, e.g., less than 10 seconds, such as about 5 seconds or even lower in some cases. The upper time limit at the application temperature is critical only to the extent that it should not be so long as to cause dissolution (or incipient dissolution) of the polymer or otherwise adversely affect its useful properties. In this connection it may be mentioned that a prelude to dissolution is sometimes evidenced by surface cracking or incipient fibrillation of treated filamentary material as seen in the optical microscope. In the case of treating agents having low solvation action on the shaped polymer, and depending also upon other influencing variables, the maximum treating time in some cases may be as long as 150 or 200 hours or more.

Other influencing factors that may cause variations in the treating time are the physical form (e.g., gaseous and/or liquid) of the treating agent during application, the application temperature and pressure conditions, the particular dye receptivity-improving treating agent used, the particular shaped polymer that is treated, the means employed in applying the treating agent, the particular tensile property and dyeing characteristics desired in the treated, shaped polymer, and other factors.

At the end of the treating period the treating agent is preferably removed from the treated, shaped polymer by any suitable means or combination of means. For example, the agent may be washed out of the treated polymer with a suitable solvent such as an alcohol, e.g., methanol, ethanol or other lower alkanol; an ether, e.g., diethyl ether, di-n-propyl ether, di-isopropyl ether, etc.; or with any other known solvent for the components of the treating agent used in practicing this invention. The solvent may be a solvent mixture such as a mixture of water and alcohol. Successive or alternate washes with organic solvent and water in any order may be used if desired. The washed, shaped polymer is then dried, e.g., at ambient temperature or at an elevated temperature in order to remove the solvent used in washing.

When one of the components of the treating agent has a relatively low boiling point, e.g., methylene chloride ($MeCl_2$), B.P. 40.1° C., such a component may be removed, if desired, from the treated, shaped polymer by volatilization under mild heat and recovered for further use; while the other, higher-boiling component of the treating agent is washed from the treated polymer as above described.

The present invention provides wholly unexpected and unobvious results in improving the dyeability characteristics and other properties of shaped polymers of the kind that are treated in accordance with this invention. For example, samples of fabric made of filamentary polyhexamethylene terephthalamide were treated for 2 minutes at ambient temperature (about 25°–30° C.) in a treating agent consisting of, by volume, 90% $MeCl_2$ and 10% dichloroacetic acid (DCAA), followed by washing with ethanol, and then boiling off the treated fabric in water for 30 minutes. The treatment had a striking effect on the dyeability of the fabric as compared with the corresponding untreated, but boiled-off control. Not only did the treatment increase the dyeability by a factor that was as much as about 3 (in terms of amount of dyestuff taken up under standard dyeing conditions) but also for approximately the same percent exhaustion of dye bath or percent dye on the filaments of the fabric, a much deeper shade of dyed fabric was obtained with the treated fabric as compared with untreated control fabric which was dyed (necessarily at more severe dyeing conditions) to the same amount of dyestuff.

The mechanism of void removal, improvement in dyeability and improvement in appearance of the dyed structure cannot be explained with certainty. These results are unusual, especially in view of the fact that some organic reagents (different from those used in practicing this invention) are known to be strong solvents for filamentary polymers but do not remove voids therefrom. Microscopic examination of cross-sections of filaments taken from the dyed fabrics described in the preceding paragraph indicate that the dyestuff penetrated the individual filaments through, but not noticeably beyond, the portion of the filament that had been cleared of voids by the application of the treating agent.

In order that those skilled in the art may better understand how the present invention can be carried into effect, the following examples are given by way of illustration and not by way of limitation. All parts and percentages are by weight unless otherwise stated.

Example 1

Samples of 220/100 multifil yarn of polyhexamethylene terephthalamide (part of the yarn used to make the fabric of polyhexamethylene terephthalamide fabric that was previously mentioned) are treated in relaxed (i.e., free to shrink) state by immersion for one minute at about 23° C. in a bath of, by volume, 90% $MeCl_2$/10% DCAA. The treated yarn is removed from the bath, washed in cold ethanol, and then boiled off in water for ½ hour. A boiled-off sample is used as a control. The changes in single-filament tensile properties between the control, the treated and ethanol-rinsed sample, and the treated, ethanol-rinsed and boiled-off sample are given below:

| | Tenacity, g./d. | Elongation, percent | Modulus, g./d. |
|---|---|---|---|
| Boiled-off sample (control) | 2.9 | 44 | 45 |
| Treated- and ethanol-rinsed sample | 1.8 | 70 | 34 |
| Treated, ethanol-rinsed and boiled-off sample | 2.1 | 58 | 38 |

Example 2

A 300/100 multifil yarn of polyhexamethylene terephthalamide is treated with the same treating agent employed in Example 1. In this test the yarn samples are immersed in a bath of the treating agent for 2 minutes at about 26° C. The treated samples are washed in water instead of ethanol as in Example 1. The changes in single filament tensile properties between the "as is" sample (i.e., sample before treatment), the treated and water-washed sample and the treated, water-washed and boiled-off sample are given below:

| | Tenacity, g./d. | Elongation, percent | Modulus, g./d. |
|---|---|---|---|
| 300/100 yarn "as is" sample | 3.5 | 34 | 55 |
| Treated and water-washed sample | 1.9 | 52 | 36 |
| Treated, water-washed and boiled-off sample | 2.3 | 65 | 34 |

The tensile data reported in Examples 1 and 2 are obtained on an Instron Tensile Tester at 3⅓" gauge, $n$ (number of determinations averaged)=10.

The results of Examples 1 and 2 show that the effect of the treatment on the individual filaments is mainly to increase elongation at the expense of tenacity, plus a decrease in tensile factor of several units. X-ray patterns of the filaments of the materials treated in each example show that the treatment with the $MeCl_2$/DCAA treating agent results in disorientation with little or no increase in crystallinity. Microscopic examination of the filaments of the treated yarns of each example shows that the voids originally present are removed by the treatment.

Example 3

This example illustrates the effect of void-removal from the filamentary polymer in improving dyeability.

Samples of the treated, water-washed and boiled-off fabric prepared from the yarn of Example 2 are prepared for dyeing tests using one acid dye under different bath conditions and three different disperse dyes.

Dyeing with an acid dye

The dyestuff is pre-pasted in a small amount of water (10–15 ml.). When a smooth paste has been obtained, the remaining water is added and the bath is brought up to volume. In one dye test, 25% aqueous formic acid based on the weight of fabric or fiber (OWF) is added to the bath to provide a pH of 2.5; and in another the bath is brought to a pH of 0.56 by adding $H_2SO_4$. The bath is mixed well by pouring from one container to another. Alizarine Sky Blue BS–CF (C.I. Part II No. 62105—4% on wt. of fiber) is used as the acid dyestuff.

The dyeings are carried out in one-pint glass Mason jars in a Launder-O-Meter at a 40:1 liquor to fiber ratio. The dye baths are preheated for 20–30 minutes. When the bath is up to temperature, the fabric samples, each 3 to 5 grams, are put in jars and the jars are clamped into the machine. Total dyeing time is 2 hours at 97° C. At the end of this period, the fabric samples are removed and then washed in hot tap water (60–70° C.) until the rinse water runs clear. The samples are then dried.

A 10 mg. portion of dried sample is dissolved by shaking with 1 ml. of trichloroacetic acid in a 50 ml. volumetric flask. After diluting to 50 ml. with a mixture of 91% methylene chloride and 9% methanol by weight, the solution is filtered through No. 1 filter paper to remove precipitated polymer.

The transmission of the filtered solution is read immediately in a Lumetron Colorimeter (Photovolt Corporation, Model 402–E). From a calibration curve of concentration vs. transmission the concentration of dyestuff is calculated as follows:

$$\frac{\text{Conc. of dyestuff}}{\text{Wt. of sample}} \times 100 = \text{Percent of dyestuff}$$

Dyeing with a disperse dye

The dyestuff is pre-pasted in a small amount of water (10–15 ml.); when a smooth paste has been obtained, the remaining water is added and the bath is brought up to volume. The liquor ratio is 40:1 and 4% (OWF) dye is used. The dye baths include 0.05 g./l. Triton X–102 surfactant (alkyl aryl polyether alcohol) and 0.5 g./l. Calgon (sodium hexametaphosphate). Deionized water (pH 6–7) is used for all the dyeings. The dyeings are carried out in 1 pint Mason tar in the Launder-O-Meter. The dye-baths are preheated to 97° C. and the fabric samples (3–5 gms.) are put in and the jars clamped into the machine. Total dyeing time is 4 hours. At the end of the dyeing time the fabric samples are removed and rinsed in hot soapy water (to remove the water-insoluble surface dye) and finally in hot tap water. The samples are dried before analyzing them for per cent dye uptake in the same manner as previously described for the acid dye (Alizarine Sky Blue BS–CF).

The results of dyeing untreated fabric and "cleared" (i.e., substantially void-free) treated fabric with both acid and disperse dyes are summarized in Table I below:

TABLE I 2 hr., 4% Launder-O-Meter Dyeings, No Detergents

| Acid Dye | Percent Dyestuff OWF* and Percent Dye-Bath Exhaustion | |
|---|---|---|
| | Control | Treated |
| Alizarine Sky Blue BS–CF (bath: pH 2.5, 25% formic acid) | *0.69 / 17.3 | *2.02 / 50.5 |
| Alizarine Sky Blue BS–CF (bath: pH 0.56, $H_2SO_4$) | *0.93 / 23.3 | *2.85 / 71.1 |

4 hrs., 4% Launder-O-Meter Dyeings with 0.05 g./l. Triton X–102 and 0.5 g./l. Calgon

| Disperse Dye | Control | Treated |
|---|---|---|
| Interchemical acetate Blue B (C.I. Part II No. 61505) | *2.30 / 57.5 | *2.92 / 73.0 |
| Amacel Rubine Red IX (C.I. Part II No. 11215) | *2.69 / 67.3 | *3.64 / 91.0 |
| "Disperse Red" Dye | *1.38 / 34.5 | *3.34 / 83.6 |

The "disperse red" dye mentioned in Table I has the following formula:

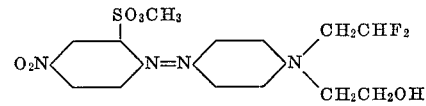

From the results of the foregoing dye tests it will be noted that the treatment of a shaped polymer of the kind involved in this invention, more particularly poly(polymethylene) terephthalamide and specifically polyhexamethylene terephthalamide in the form of a textile fabric materially raised the level of dyeability of the untreated material with various dyes including both acid and disperse dyes. The greatest increase in dyeability occurred with some of the most "difficult-to-dye" colorants, namely, the acid dye Alizarine Sky Blue BS–CF and the "disperse red" dye. Furthermore, these last-mentioned dyes yielded dyed textile material that exhibited good washfastness at the high dye-concentration levels found in the devoided textile.

Example 4

In this example two different multifilament yarns are treated under various conditions (e.g., for varying periods of time, and relaxed or taut) with two different treating agents of the kind used in practicing this invention, and then dyed with an acid dyestuff in one series and a disperse dyestuff in another series using a "microdyeing" procedure characterized below. The results are summarized in Table II.

TABLE II

[Tensile data at 3⅓″ gauge, n=10]

| | | Multifilament Yarn A | | | | | Multifilament Yarn B, Treated Taut in 90/10 MeCl₂/DCAA, Methanol Washed, Boiled Off | |
|---|---|---|---|---|---|---|---|---|
| | As Is | Boiled Off | Treated Relaxed in 90/10 MeCl₂/DCAA, Ethanol Washed, Boiled Off | | | Treated Relaxed in 90/10 TCE/DCAA, Ethanol Washed, Boiled Off 4 min.[1] | | |
| | | | 30 sec. | 1 min. | 2 min. | | As Is | 8 min. |
| Tenacity, g./d | 2.93 | 3.26 | 2.71 | 2.52 | 2.70 | 2.00 | 3.65 | 2.91 |
| Elongation, percent | 45 | 39 | 46 | 56 | 51 | 60 | 26 | 25 |
| Modulus, g./d | 50 | 48 | 39 | 39 | 42 | 27 | 64 | 51 |
| Percent Acid Dyestuff [2] | | 0.98 (1.08) | 3.70 (3.38) | 7.8 (3.5) | 5.6 (3.25) | 5.2 (3.31) | 0.30 | 1.35 |
| Percent "Disperse Red" Dyestuff [3] | | 1.45 (1.35) | 15.8 (3.93) | 16.9 (3.99) | 14.7 (4.00) | 19.7 (3.65) | 9.58 | 4.95 |

[1] TCE=s-tetrachloroethane.
[2] Alizarine Sky Blue BS–CF, 2 hr. microdyeing.
[3] Disperse Red dye, 2 hr. microdyeing. Parentheses indicate results obtained with 2 hr. (4%) dyeings.

The yarn designated as multifilament yarn A in Table II is from the same spinning of polyhexamethylene terephthalamide yarn used in preceding examples. It has a rather high degree of "voidiness," and shows a characteristic "ring" or skin/core void structure. The other yarn (multifilament yarn B) is a multifilament yarn of polyhexamethylene terephthalamide that was spun on a different machine from that used in producing yarn A. Multifil yarn B shows a much lower degree and more uniform radial distribution of voids than that of yarn A. The filaments of yarn B required from 5 to 6 minutes for complete penetration by a treating agent consisting of, by volume, 90% $MeCl_2$ and 10% DCAA (90/10 $MeCl_2$/DCAA) as compared with about one minute for yarn A of the same d.p.f.

With the exception of the 30-second treatment (column 3 of Table II), the treating times result in complete (substantially complete) void clearing of the filaments of the particular yarn with either 90/10 $MeCl_2$/DCAA or with a treating agent consisting of, by volume, 90% s-tetrachloroethane (TCE) and 10% dichloroacetic acid (90/10 TCE/DCAA). All treatments are carried out at ambient temperature (about 25°).

All treatments described in Table II show the same trend indicative of a relaxing effect on the filaments, i.e., decrease of tenacity, modulus and yield stress, and an increase in percent elongation except in the case of filamentary material treated taut (i.e., at constant length) in which case the percent elongation remains substantially constant. The loss of tensile factor ranges from about 0.5 to 4. In the case of filaments treated in relaxed state, the dyeability increases rapidly with the duration of the treatment, and then levels off at a treating time which corresponds approximately to complete penetration of the treating agent. X-ray examination shows little or no disorientation (of the crystalline regions) of the filamentary material that has been treated taut, even though the penetration has been complete; and the dyeability of the taut-treated filamentary material is less than that obtained when the filaments are treated relaxed and are completely penetrated by the treating agent.

The "microdyeing" procedure (infinite dye concentration and high liquor to sample ratio) used in Example 4 were carried out in the Launder-O-Meter. This machine provided a constant and reproducible rate of agitation and allowed close temperature control.

All microdyebaths contained 150 mg. dyestuff in 300 ml. solution. The fiber sample weight was 110 mg. The fiber samples were placed into the preheated dyebaths contained in one pint glass jars—the jars were sealed and placed in the Launder-O-Meter for the specified dyeing time.

When microdyeing with the Alizarine Sky Blue BS=CF acid dye enough formic acid is added to the bath to obtain pH 2.5. No detergents are used.

When microdyeing with the disperse dyes the pH is that of the deionized water (6–7), and 0.5 gm./liter Igepon T–77 and 0.5 g./l. Calgon are included in the disperse dye microbath.

The percent dye on weight of fiber was determined via Lumetron analysis. The samples for analysis were hot water, methanol or tetrachloroethylene rinsed to remove surface dye (depending upon the soluble nature of the dye) and air dried. A 20 mg. sample was randomly teased from the total sample and accurately weighed on an analytical balance (±0.2 mg.). This sample was dissolved with 1 ml. trifluoroacetic acid in a 50 ml. volumetric flask. Dilution to 50 ml. was made with 91/9 methylene chloride/methanol. The transmittance of a filtered portion of this solution was determined on the Lumetron and translated into mg. of dye per 50 ml. of solution from a Beer's Law plot for the particular dyestuff.

A DK spectrophotometer absorption curve was obtained on each dyestuff analyzed to select the Lumetron filter best suited to transmit the specific absorption band of the dye to be determined. All dye contents are expressed as percent *dye powder* and *not* as percent oil color present.

Example 5

Essentially the same procedures are followed as described in each of Examples 1, 2 and 3 with the exception that instead of yarn and fabric comprised of filaments of polyhexamethylene terephthalamide, there are used yarn and fabric comprised of filaments of polyhexamethylene isophthalamide. Similar results are obtained.

Example 6

The procedure described in Example 4 with particular reference to the treatment of multifilament yarn A with 90/10 $MeCl_2$/DCAA in one case and with 90/10 TCE/DCAA in another case are repeated in essentially the same manner, in individual runs, with the exception that the volume proportions of the components of these treating agents are varied in individual runs as follows:

(a) 93.5/6.5 $MeCl_2$/trichloroacetic acid (TCAA)
(b) 85/15 $MeCl_2$/DCAA
(c) 94/6 TCE/TCAA
(d) 80/20 TCE/DCAA Similar results are obtained.

Example 7

The same procedure is followed as in Examples 1, 2 and 3 with the exception that there are employed in individual runs the following treating agents in the specified volume proportions in place of the 90/10 $MeCl_2$/DCAA employed in the aforementioned examples, and the further exception noted below:

90 methylene bromide/10 dibromoacetic acid (application temperature of treating agent: about 70° C.)
90 $MeCl_2$/10 trifluoroacetic acid Similar results are obtained.

Instead of dyeing with an acid or disperse dyestuff as illustrated in certain of the examples, the treated shaped polymer may be dyed with any other dyestuffs for polyamides and for other synthetic polymers that are available and suitable for use, such, for instance, as premetallized dyestuffs, e.g., C.I. Acid Orange 85
C.I. Acid Red 218
C.I. Acid Brown 45
C.I. Orange 86
C.I. Acid Red 220
C.I. Acid Yellow 114
C.I. Acid Black 52
C.I. Acid Green 43

The following general observations may be further helpful in a better understanding of the instant invention, how it may be carried into effect, and the explanations or theories that may be given and some conclusions that properly may be drawn from the test results.

(1) The voids are "cleared," regardless of their initial level, precisely to the extent of penetration of the particular treating agent employed. Correspondingly, the dyestuff penetrates only the cleared portion of the filament, even if the dye has access to non-cleared portions from the beginning of dyeing. Thus, for filaments treated in the relaxed state, the percent of dye-uptake is approximately proportional to the volume of the filament cleared or devoided, up to the point of complete clearing.

(2) The effect of the treating agent used in practicing this invention, e.g. a 90/10 volume mixture of, respectively, dichloromethane and dichloroacetic acid on the physical properties of the filamentary material most probably is one that involves relaxation or disorientation. For filaments treated in relaxed state (i.e., free to shrink), the increase in percentage of elongation is approximately proportional to the volume of the filament cleared, and hence the percent dye-uptake (short of complete clearing) is approximately proportional to the amount of relaxation, as judged by percent increase in elongation.

(3) Voids can be removed without obtaining a corresponding large increase in dyeability (as with fiber treated taut). Thus, voids can be removed by a much smaller amount of relaxation than is required to double or triple the dyeability.

It is to be understood that the foregoing description is given merely by way of illustration and that many variations may be made therein without departing from the spirit of my invention.

The embodiment of the invention in which an exclusive property or privilege is claimed are defined as follows:

1. The method of improving the dyeability of a shaped, wet-formed, difficulty-meltable synthetic polyamide material selected from the groups consisting essentially of aliphatic and aromatic polyamides, said method comprising:
    (A) contacting the said shaped polymer, for a period of time sufficient to improve its dyeability characteristics, with a dyeability-improving treating agent comprised of a mixture of
        (a) at least one member of the group of halogenated alkanes having from one through four carbon atoms,
        (b) at least one member of the group of halogenated monocarboxylic acids represented by the general formula $$X_m C_n H_{(2n+1-m)} COOH$$

wherein $n$ is an integer from one to four, X represents halogen atoms which may be the same or different and are selected from the group consisting of chlorine, bromine and fluorine, and $m$ represents an integer from one to $2n+1$, the proportions of (a) and (b) being such as to effect swelling of the said shaped polymer at the application temperature but insufficient to dissolve it at the said temperature; and
    (B) removing the dyeability-improving agent from the treated, shaped polymer.

2. The method as in claim 1 wherein the proportions of (a) and (b) are, by volume at about 25° C., from 65 to 97% of (a) to from 3 to 35% of (b), the volume percentage proportions within the stated ranges being such as to provide a treating agent that will effect swelling of the shaped polymer undergoing treatment at the application temperature but insufficient to dissolve the said polymer at the said temperature.

3. The method as in claim 1 wherein the application temperature is within the range of from ambient temperature up to the initial boiling point of the defined treating agent at atmospheric pressure.

4. The method as in claim 1 wherein component (a) of the treating agent is dichloromethane.

5. The method as in claim 1 wherein component (b) of the treating agent is dichloroacetic acid.

6. The method as in claim 1 wherein components (a) and (b) of the treating agent are dichloromethane and dichloroacetic acid, respectively.

7. The method as in claim 1 wherein the shaped, wet-formed, difficultly-meltable polyamide is a poly(polymethylene) terephthalamide.

8. The method as in claim 7 wherein the poly(polymethylene) terephthalamide is polyhexamethylene terephthalamide.

9. The method of removing voids from and improving the dyeability of a poly(polymethylene) terephthalamide in filamentary form which comprises:
    (A) immersing the said filamentary polymer in a treating agent consisting essentially of a mixture of dichloromethane and dichloroacetic acid at a temperature within the range of from ambient temperature up to the intial boiling point of the defined treating agent at atmospheric pressure, the proportions of dichloromethane and dichloroacetic acid being such as to provide a treating agent that will effect swelling of the said filamentary polymer within the said temperature range but insufficient to dissolve the said polymer at the said temperature;
    (B) maintaining the said filamentary material in contact with the said treating agent at a temperature within the range of from ambient temperature up to the initial boiling point of the defined treating agent at atmospheric pressure and for a period of time such as to effect swelling of the filamentary polymer within the said temperature range but insufficient to dissolve the said polymer at the said temperature; and
    (C) removing the treating agent from the said filamentary polymer.

10. The method as in claim 9 wherein the poly(polymethylene) terephthalamide is polyhexamethylene terephthalamide and the treating agent is a mixture of, by volume at about 25° C., about 90% dichloromethane and about 10% dichloroacetic acid.

11. An article comprising treated, shaped, wet-formed, difficultly-meltable synthetic polyamide material selected from the group consisting essentially of aliphatic and aromatic polyamides said treated polyamide having improved dyeabilty as compared with the untreated shaped polyamide and having been treated with a dyeability-improving treating agent comprised of a mixture of
    (a) at least one member of the group of halogenated alkanes having from one through four carbon atoms, and
    (b) at least one member of the group of halogenated monocarboxylic acids represented by the general formula $$X_m C_n H_{(2n+1-m)} COOH$$

wherein $n$ is an integer from one to four, X represents halogen atoms which may be the same or different and are selected from the group consisting of chlorine, bromine and fluorine, and $m$ represents an integer from one to $2n+1$, the proportions of (a) and (b) being such as to effect swelling of the said shaped polyamide at the application temperature but insufficient to dissolve it at the said temperature.

12. An article as in claim 11 wherein the shaped, wet-formed, difficultly-meltable polyamide is a filamentary, wet-spun poly(polymethylene) terephthalamide.

13. A filamentary polyhexamethylene terephthalamide of improved dyeing characteristics, said polyhexamethylene terephthalamide having been treated with a treating agent consisting essentially of a mixture of, by volume at about 25° C., about 90% dichloromethane and about 10% dichloroacetic acid, and removing the treating agent from the treated filamentary polymer.

14. The dyed filamentary material of claim 13.

References Cited

UNITED STATES PATENTS

| | | | |
|---|---|---|---|
| 2,251,508 | 8/1941 | Watson | 8—113 |
| 2,904,840 | 9/1959 | Hochreuter | 18—48 |
| 3,154,512 | 8/1964 | Barcyewski | 260—31.2 |
| 3,154,609 | 8/1964 | Cipriani | 264—168 |
| 3,154,614 | 8/1964 | Aoko | 264—188 |

GEORGE F. LESMES, Primary Examiner

J. P. BRAMMER, Assistant Examiner

U.S. Cl. X.R.

8—4, 130.1, 92, 94; 260—78

PO-1050
(5/69)

UNITED STATES PATENT OFFICE
CERTIFICATE OF CORRECTION

Patent No. 3,475,771          Dated November 4, 1969

Inventor(s) Richard G. Quynn

It is certified that error appears in the above-identified patent and that said Letters Patent are hereby corrected as shown below:

In column 1, line 31, "difficulty" should be ---difficultly--

In column 1, line 68, "is" should be ---in---.

In column 5, line 59, "imersing" should be ---immersing---.

In column 6, line 64, left our ---(--- before "or removal".

In column 8, line 38, "26" should be ---25---.

In Table II, in the next-to-last column, "9.58" should be ---0.58---.

In Table II, in the last column, "4.95" should be ---4.05---.

Signed and sealed this 28th day of December 1971.

(SEAL)
Attest:

EDWARD M. FLETCHER, JR.          ROBERT GOTTSCHALK
Attesting Officer                  Acting Commissioner of Patents